United States Patent

Ishida et al.

Patent Number: 6,045,349
Date of Patent: Apr. 4, 2000

[54] ROLLING APPARATUS FOR PLASTIC FILM

[75] Inventors: Takashi Ishida, Yokohama; Tadayoshi Kato, Kawasaki, both of Japan

[73] Assignee: Nippon Petrochemicals Company Limited, Tokyo, Japan

[21] Appl. No.: 08/875,766

[22] PCT Filed: Dec. 6, 1996

[86] PCT No.: PCT/JP96/03581

§ 371 Date: Aug. 5, 1997

§ 102(e) Date: Aug. 5, 1997

[87] PCT Pub. No.: WO97/20672

PCT Pub. Date: Jun. 12, 1997

[30] Foreign Application Priority Data

Dec. 7, 1995 [JP] Japan ................................ 7-319147

[51] Int. Cl.⁷ ................................................. B29C 43/46
[52] U.S. Cl. ......................... 425/335; 425/363; 425/367
[58] Field of Search ................................. 425/327, 372, 425/363, 366, 367, 335

[56] References Cited

U.S. PATENT DOCUMENTS

| | | | |
|---|---|---|---|
| 2,815,531 | 12/1957 | Stewart | 425/335 |
| 3,273,199 | 9/1966 | Kleinewefers | 425/335 |
| 3,499,185 | 3/1970 | Schmidt et al. | 425/335 |
| 3,964,848 | 6/1976 | Wockener | 425/335 |
| 4,015,919 | 4/1977 | Pawelczyk | 425/367 |
| 4,038,012 | 7/1977 | Sander | 425/363 |
| 4,117,054 | 9/1978 | Salo | 264/40.1 |
| 4,171,942 | 10/1979 | Missenard | 425/367 |
| 4,194,872 | 3/1980 | Hinterkeuser et al. | 425/363 |
| 4,596,523 | 6/1986 | Whitehead | 425/367 |
| 5,397,526 | 3/1995 | Perkins et al. | 264/175 |
| 5,607,703 | 3/1997 | Sakai et al. | 425/145 |
| 5,733,589 | 3/1998 | Oki | 425/364 R |

FOREIGN PATENT DOCUMENTS 4-110133   4/1992   Japan .
4-185790   7/1992   Japan .

*Primary Examiner*—James P. Mackey
*Attorney, Agent, or Firm*—Scully, Scott Murphy & Presser

[57] ABSTRACT

A wrinkleless plastic film having excellent quality without the reduction of width can be manufactured with high productivity using a rolling apparatus in which a plastic film is rolled stepwise at two rolling deformation points formed by two driving rolls and a follower roll, which rolls are brought into continuous contact with each other along the passage of the plastic film and said follower roll is driven by the rotation of said two driving rolls.

5 Claims, 6 Drawing Sheets

ROLLING APPARATUS FOR PLASTIC FILM

BACKGROUND OF THE INVENTION

1. Field of the Invention

This invention relates to a rolling apparatus for a plastic film. More particularly, the invention relates to an improved rolling apparatus in which various deficiencies in a high ratio of rolling operation with conventional apparatus have been eliminated to produce plastics films of excellent quality without generating wrinkles or the like with high productivity.

2. Discussion of the Prior Art

As described, for example, in Japanese Utility Model Laid-open Publication No. 52-135465, the rolling of a plastics film is the process in which a plastic film is passed through a pair of rolls to be reduced in thickness under pressure. The rolling action is substantially caused to occur at the deformation point at which the pair of rolls are brought into contact and which point extends in the longitudinal direction of the rolls.

The above-mentioned gazette discloses that when the peripheral speeds of a pair of rolls are made different and a plastic film is fed between the rolls so as to bring the film into contact with the surface of a lower speed roll, reliable rolling action can be done at the deformation point, the rolling ratio is improved and the occurrence of wrinkles or waving of the plastic film can be avoided.

In order to carry out the rolling at a high rolling ratio with a conventional rolling apparatus, however, it is necessary to impart high pressing force to the pressure rolls, thereby causing the following problems. That is, the bursting of plastic films to be rolled is liable to occur due to the applied high pressure, the deflection of rolls is bring about due to the deformation resistance of a plastic film, and wrinkles or folds in the film is caused to occur due to the difficulty in the feeding of plastic film into the deformation point.

It is, therefore, the object of the present invention to provide a rolling apparatus for a plastic film which is capable of producing a quality plastic film with high productivity.

SUMMARY OF THE INVENTION

Figure 1:
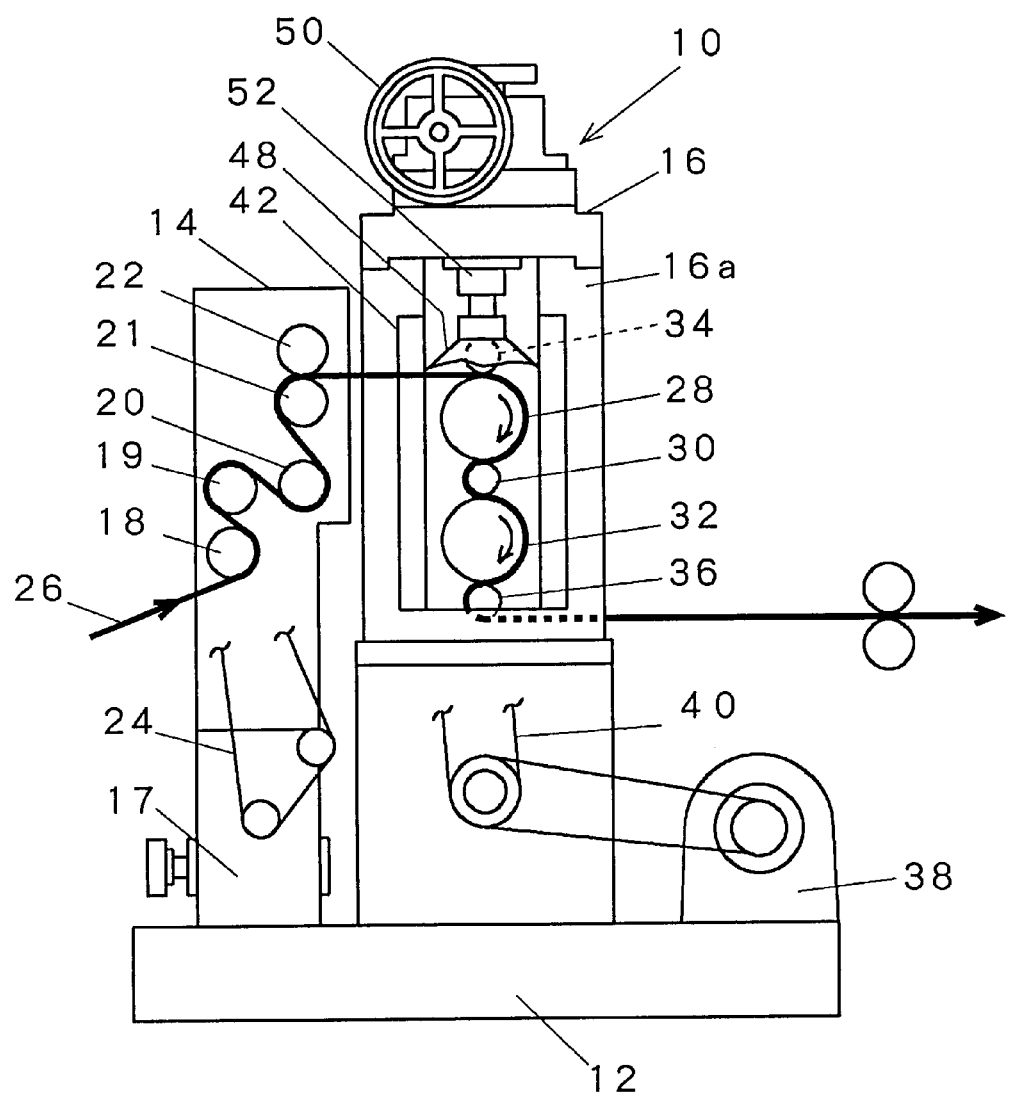
FIG. 1 is a front view of an embodiment of a rolling apparatus for a plastic film in the present invention.

The rolling apparatus for plastic film in the present invention is characterized in that at least three pressure rolls are disposed along the passage of a plastic film. One deformation point is formed between two rolls out of the three rolls. Furthermore, the above at least three rolls form plural deformation points so as to roll the plastic film stepwise.

The above problems in the conventional rolling apparatus such as described above are caused to occur to carry out the rolling at a high rolling ratio by utilizing only one rolling deformation point. According to the present invention, the rolling is carried out by utilizing plural points of deformation which are formed along the passage of a plastic film. It is thus possible to achieve the rolling at a high rolling ratio as a overall process while conducting the rolling at a low rolling ratio in each roll deformation point. As a result, it is possible to carry out the rolling of a plastic film without generating wrinkle or the like together with to attain the high productivity.

In the above-described rolling apparatus of the invention, it is desirable that the rolling apparatus is provided with drive means to drive the above-mentioned at least three rolls, two rolls defining each deformation point are driven at different peripheral speeds and the roll with a higher peripheral speed is applied to one side surface of a plastic film at one rolling deformation point and another roll with also a higher peripheral speed is applied to the other side surface of the plastic film at another rolling deformation point. Thus, one side and the other side of the surface of the plastic film are alternately subjected to tensile stresses, thereby enabling to prevent the plastic film from curling, which has been caused in the conventional rolling operation carried out with a single deformation point.

In addition to the above described features, it is desirable to arrange that the foregoing at least three rolls are so located as to form successive rolling deformation points. Thus, in a preferred form of the rolling apparatus, it is possible to provide two rolling deformation points with only three pressure rolls.

It is particularly desirable to use two driving rolls out of the at least three rolls and follower roll or rolls are disposed between the two driving rolls and driven by them. It is thus necessary to drive only two rolls and the remaining rolls are driven by means of the contact with the driving rolls.

In addition to the above described features, it is desirable to provide a means to give pressing down force, in which one of two driving rolls is pushed toward the other roll in order to impart press-down force or the above-mentioned follower roll is pushed toward the two driving rolls in order to impart press-down force. With this system, only two pressure rolls are required to be driven. In addition, the press-down force providing means can be made simple.

In the above rolling apparatus, the at least three rolls can also be made up of even-numbered rolls arranged in pairs. In this case, it is desirable to incorporate the means to give pressing down force, by which one of the paired rolls is pushed toward the other roll to impart the pressing down force.

Furthermore, the present invention provides a rolling apparatus for a plastic film which is characterized in that the apparatus comprises an upstream side driving roll, a downstream side driving roll which is driven at a higher peripheral speed than that of the upstream side driving roll, and a follower roll which forms an upstream side deformation point with the upstream side driving roll to effect rolling of a plastic film while forming a downstream side deformation point with the downstream side driving roll to effect further the rolling of plastic film once rolled at the upstream side deformation point.

Furthermore, the present invention provides a rolling apparatus for a plastic film which is characterized in that the rolling apparatus comprises a upstream side driving roll, a downstream side driving roll which is driven at a higher peripheral speed than the upstream side driving roll, an upstream side follower roll which forms an upstream side deformation point with the upstream side driving roll to effect rolling of a plastic film and a downstream side follower roll which forms a middle deformation point with the upstream side driving roll to effect further the rolling of plastic film once rolled at the upstream side deformation point while forming a downstream side deformation point with the downstream side driving roll to effect still further the rolling of plastic film once rolled at the middle deformation point.

In addition, the present invention provides a rolling apparatus for a plastic film which is characterized in that the apparatus comprises a pair of upstream side pressure rolls to effect the rolling of plastic film, a pair of downstream side pressure rolls to effect further the rolling of the plastic film once rolled with the upstream side pressure roll and driving means to drive the pair of the upstream side pressure rolls in such a manner that the peripheral speed of a roll on one side is larger than that of the other pressure roll on the other side as well as to drive a pair of the downstream side pressure rolls in such a manner that the peripheral speed of the roll on one side is larger than that of the other roll on the other side.

DETAILED DESCRIPTION OF PREFERRED EMBODIMENTS

Referring to the drawings, the present invention will be described in the following.

Figure 2:
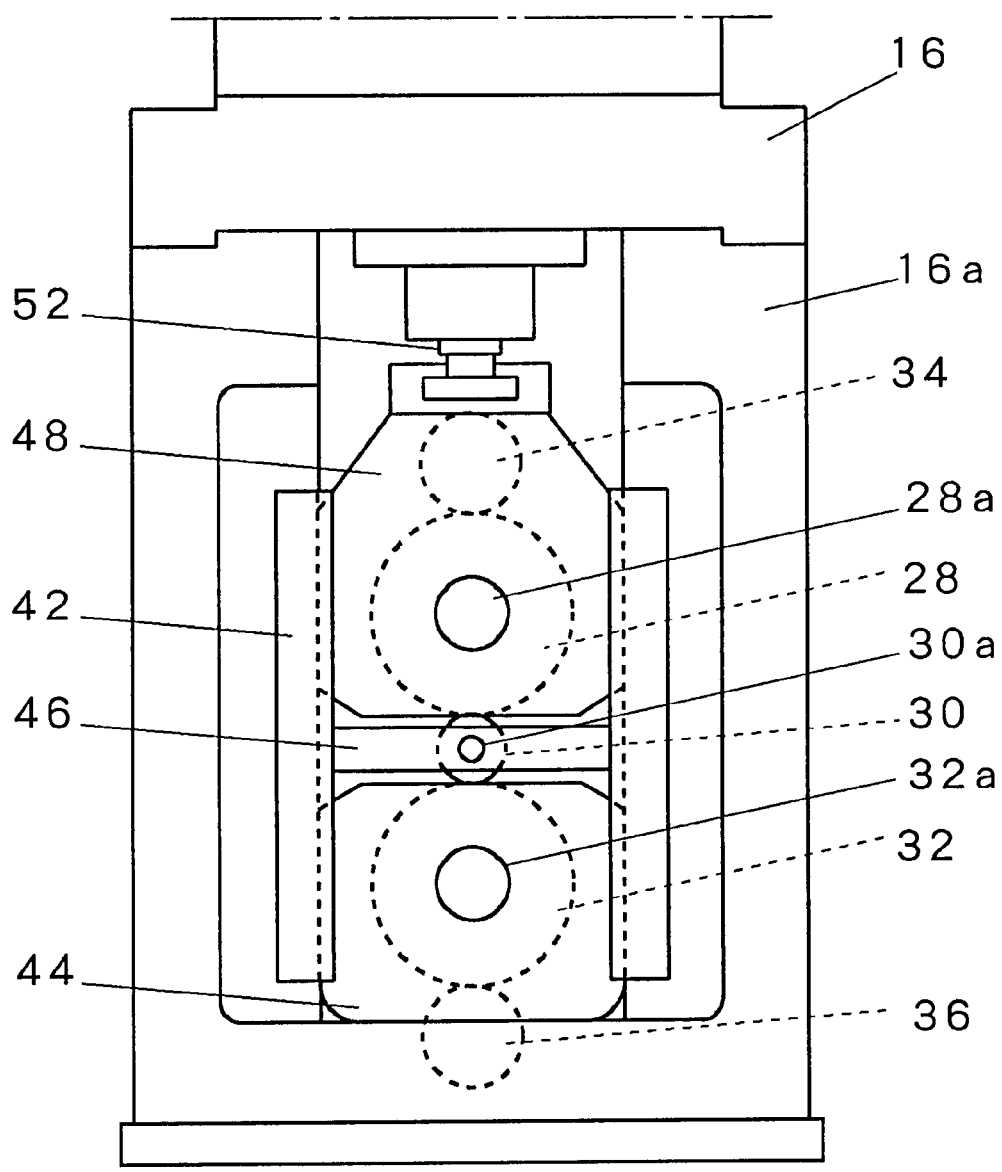
FIG. 2 is an enlarged front view of a part of the rolling unit of the apparatus shown in FIG. 1.

FIG. 1 shows a front view of a rolling apparatus of a plastic film in accordance with one embodiment of the present invention. FIG. 2 is an enlarged view of a rolling unit as a part of the rolling apparatus shown in FIG. 1.

In FIG. 1, the rolling apparatus 10 includes a frame 12, a preheating unit 14, and a rolling unit 16. The preheating unit 14 is equipped with a driving motor 17 and preheating rolls 18, 19, 20, 21 and 22. The preheating rolls 18, 19, 20, 21 and 22 are driven by the motor 17 through pulley or belt device 24. A plastic film 26 is preheated by means of the preheating rolls 18, 19, 20, 21 and 22, which rolls are fed with heated fluid (not shown). The plastic film 26 is nipped by the final preheating rolls 21 and 22 and it is delivered to the rolling unit 16.

As shown in FIGS. 1 and 2, the rolling unit 16 includes three rolls 28, 30, 32 which are successively disposed in the vertical direction. The pressure rolls 28 and 32 are mounted with nip rolls 34 and 36, respectively.

The roll 28 located in the upper side is a driving roll of lower peripheral speed and the roll 32 located in the lower side is a driving roll of higher peripheral speed. The roll 30 in the middle position is a follower roll so that it is rotated freely and it is driven to rotate via the plastic film 26 by the contact with the rolls 28 and 32. This intermediate follower roll 30 is small in diameter as compared with those of the driving rolls 28 and 32.

The lower peripheral speed driving roll 28 is driven by the motor 38 via a pulley or belt device 40. In this case, the pulley or belt mechanism 40 may include a variable speed multistage pulley or a gear box. Likewise, the higher peripheral speed driving roll 32 is also driven through another pulley or belt mechanism (not shown). The rolling of the plastic film 26 is carried out with a heating fluid (not shown) which is feed into the lower peripheral speed driving roll 28 and the higher peripheral speed driving roll 32 to heat it.

The end frame 16a of the rolling unit 16 is provided with a slide guide 42 extending vertically. A lower press-down block 44, a middle press-down block 46 and an upper press-down block 48 are slidably engaged in the slide guide 42. The press-down wheel 50 is connected to the upper press-down block 48 via a feed screw mechanism 52. The lower press-down block 44 is usually kept at a fixed position in the vertically downward direction. The middle press-down block 46 and the upper press-down block 48 are movable perpendicularly in relation to the lower press-down block 44.

In FIG. 2, the shaft 32a of the higher peripheral speed driving roll 32 which is located on the lower side is attached to the lower press-down block 44 via a bearing and the shaft of the lower peripheral speed driving roll 28 which is located on the upper side is attached to the upper press-down block 48 via a bearing. Therefore, the follower roll 30 and the lower peripheral speed driving roll 28 are movable perpendicularly together with the associated blocks. Thus the action to press down the lower peripheral speed driving roll 28 to the follower roll 30 and to the higher peripheral speed driving roll 32 by means of operating the press-down wheel 50, enables to generate the pressing down force. While, the pressing down force can also be imparted by means of a hydraulic mechanism or the like.

The nip rolls 34, 36 are supported by means of a supporting mechanism including, for example, an air cylinder. They are pushed to the lower peripheral speed driving roll 28 and the higher peripheral speed driving roll 32, respectively, with adequate pressure. Then, the nip rolls 34, 36 rotate at the same peripheral speed with the lower peripheral speed driving roll 28 and the higher peripheral speed driving roll 32, respectively.

Figure 3:
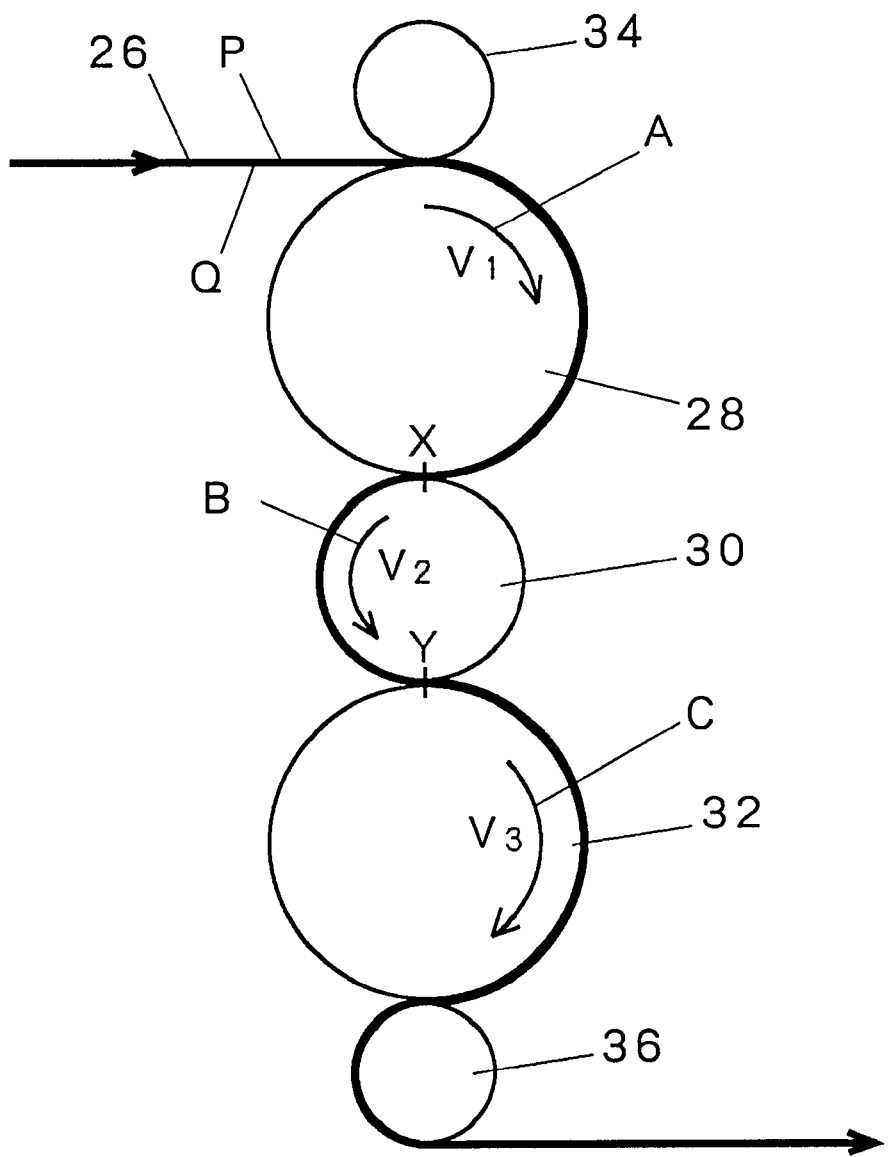
FIG. 3 is an enlarged front view of pressure rolls in according with the present invention.

FIG. 3 is a partial enlarged view to illustrate the relationship among the lower peripheral speed driving roll 28, the follower roll 30 and the higher peripheral speed driving roll 32. The first rolling deformation point X, which are extending in parallel to the axis of the roll, is formed between the lower peripheral speed driving roll 28 and the follower roll 30. The second deformation point Y is formed between the higher peripheral speed driving roll 32 and the follower roll 30.

The lower peripheral speed driving roll 28 is driven in the direction of an arrow A with at a peripheral speed $V_1$ and the higher peripheral speed driving roll 32 is driven in the direction of an arrow C at a peripheral speed $V_3$. The follower roll 30 is driven to rotate by the rotation of driving rolls 28 and 32 in the direction of an arrow B at a peripheral speed $V_2$ with interposing the plastic film 26. The relation among the above speeds $V_1$ and $V_3$ and the speed of follower roll $V_2$ is expressed by an equation of $V_1 < V_2 < V_3$.

Comparative rolling tests have been carried out using a rolling apparatus formed with such features in accordance with the present invention together with a prior art rolling apparatus and following results were obtained. Table 1 shows the results obtained when a high density polyethylene (HDPE, 60 μm thickness) was used as a film material and Table 2, polypropylene (PP, 60 μm thickness) and Table 3, polypropylene (PP, 100 μm thickness), respectively.

Figure 7:
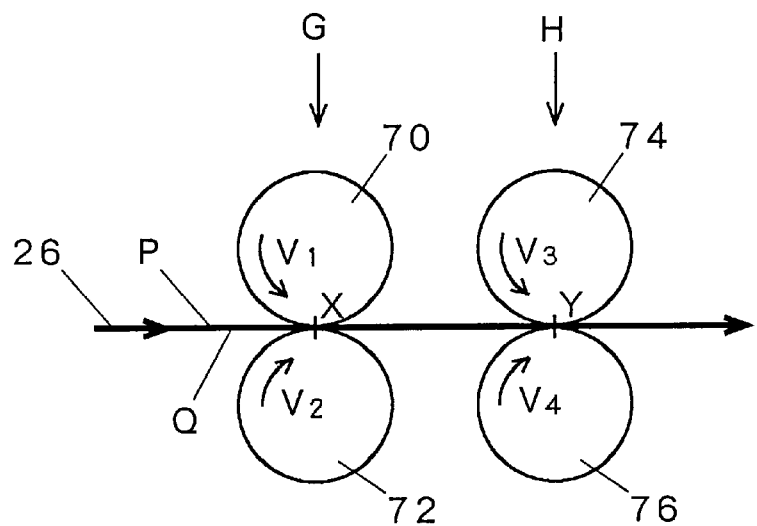
FIG. 7 is a front view of another embodiment of pressure rolls of the rolling apparatus for a plastic film in accordance with the present invention.

In these tables, the comparative examples relate to the prior art having only one rolling deformation point. Example 1 of the present invention relates to a test using a rolling apparatus employing two pairs of rolls as shown in FIG. 7 which will be described later on. Example 2 of the present invention relates to a test using a rolling apparatus with three successive rolls as shown in FIG. 3. $V_0$ is the peripheral speed of the preheating rolls 21 and 22 as shown in FIG. 1.

The surface property and the reduction of width are evaluated by the following criteria. Surface Properties:

O: The whole is uniformly transparent.

Δ: Striped patterns due to uneven deformation are observed depending on the angle of reflection X: Striped patterns are apparently observed or opaque portions are left Reduction of Width:

O: The reduction of width of film material is not more than 10%

Δ: The reduction of width of film material is from 10% to 15%

X: The reduction of width of film material is more than 15%

TABLE 1

(HDPE of 60 μm thick)

|  | Comp. Example | Example 1 | Example 2 |
| --- | --- | --- | --- |
| $V_0$ | 2 m/min | 2 m/mim | 2 m/min |
| $V_1$ | 6 m/min | 3 m/mim | 2 m/min |
| $V_2$ | 6 m/min | 4 m/mim | 2.7 m/min |
| $V_3$ |  | 6 m/mim | 6 m/min |
| $V_4$ |  | 5 m/mim |  |
| Evaluation |  |  |  |
| Surface Property | 0 | 0 | 0 |
| Width Reduction | X | Δ | 0 |

According to the results shown in Table 1, in Example 1 of the present invention, two stage rolling was carried out under the conditions that the ratios of the peripheral speed were 3/4 at the first rolling deformation point X and 5/6 at the second rolling deformation point Y. In Example 2, two stage rolling was carried out under the conditions that the ratios of the peripheral speed were 2/2.7 at the first rolling deformation point X and 2.7/6 at the second rolling deformation point Y.

TABLE 2

(PP of 60 μm thick)

|  | Comp. Example | Example 1 | Example 2 |
| --- | --- | --- | --- |
| $V_0$ | 2 m/min | 2 m/mim | 2 m/min |
| $V_1$ | 6 m/min | 3 m/mim | 2 m/min |
| $V_2$ | 6 m/min | 4 m/mim | 3.7 m/min |
| $V_3$ |  | 6 m/mim | 6 m/min |
| $V_4$ |  | 5 m/mim |  |
| Evaluation |  |  |  |
| Surface Property | Δ | 0 | 0 |
| Width Reduction | X | Δ | 0 |

TABLE 3

(PP of 100 μm thick)

|  | Comp. Example | Example 1 | Example 2 |
| --- | --- | --- | --- |
| $V_0$ | 2 m/min | 2 m/mim | 2 m/min |
| $V_1$ | 10 m/min | 2 m/mim | 2 m/min |
| $V_2$ | 10 m/min | 3.8 m/mim | 5.4 m/min |
| $V_3$ |  | 6.4 m/mim | 10 m/min |
| $V_4$ |  | 10 m/mim |  |
| Evaluation |  |  |  |
| Surface Property | Forming was impossible | Δ | X |
| Width Reduction | Tearing occurred | 0 | 0 |

In Table 2, the test results obtained using the rolls driven at the same peripheral speeds as those in Table 1 are shown. However, in Example 2 of the present invention, the peripheral speed $V_2$ of the follower middle roll 30 was 3.7 m/min.

In Example 1 of the present invention shown in Table 3, two stage rolling was carried out under the conditions that the ratios of the peripheral speeds were 2/3.8 at the first rolling deformation point X and 6.4/10 at the second rolling deformation point Y. In Example 2 of the present invention, the peripheral speeds of the driving rolls were 2 m/min and 10 m/min, respectively, while the peripheral speed $V_2$ of the follower middle roll 30 was 5.4 m/min. Accordingly, the two stage rolling was carried out under the conditions that the ratios of the peripheral speeds were 2/5.4 at the first rolling deformation point X and 5.4/10 at the second rolling deformation point Y.

Even though it may be considered that the follower roll 30 is not rotated because it is sandwiched between the high speed roll 28 and low speed roll 32 which are driven at different peripheral speeds, the follower roll 30 can be rotated in a stable condition at the peripheral speed $V_2$ with a relationship of $V_1<V_2<V_3$, during the practical rolling operation of a plastic film. The peripheral speed $V_2$ varies with the types of the plastic film to be rolled. But it was unexpectedly found out that the follower roll 30 is able to rotate in a stable condition at a certain peripheral speed provided that constant processing conditions are determined.

From the forgoing results, according to the present invention, it is possible to improve the surface properties by preventing the occurrence of wrinkles, the change of transparency and the reduction of width of plastic film 26 after the rolling even in a operation with increased rolling ratio. In addition, it is possible to apply smaller rolling pressure in each rolling step as compared with the conventional single stage rolling. As a result, the load imposed on each roll is lowered and the deflection of the roll is reduced.

It is also possible to make the diameter of roll smaller and the length, longer, so that the material having lower hardness can be used for making rolls. Therefore, it becomes possible to carry out the rolling of a plastic film having broader width. This contributes to expand the possibility in the selection of raw materials to be rolled and to improve the productivity. In addition, the smaller roll deflection serves to improve the quality of rolling caused by the deformation of rolls. Small diameter rolls enable to make the size and, particularly, the weight of rolling apparatus small and, as a result, the effect of rolling deformation can be improved because of the large curvature of rolls. In other words, even in the rolling formation of continuous films, not only the deformation at a deformation point in rolling but also the partial deformation by stretching due to the tension caused by the speed difference between rolls take place and the ratio of the deformation by rolling can be made larger as the curvature becomes larger. Particularly with the construction shown in FIG. 1, because the multistage rolling operation is possible with one set of pressing mechanism, such a multistage rolling operation does not lead to raise in the equipment cost.

The materials used for making rolls are required to be strong enough to withstand the stress of rolled materials in the rolling deformation and generally are selected from hard materials. Meanwhile, in the rolling of a plastic film, the interaction between the surfaces of roll and film, friction coefficient, adhesion property, slipperiness, and the like properties greatly affect on the stability in the rolling operation. It is required to select a suitable material in view of these properties. However, it has often been difficult in the prior art to select a desired material because of the presence of the excessive limitation in the hardness.

It is important that the follower middle roll 30 can be rotated freely in view of the stability of rolling operation. When two stage rolling is carried out under the condition that the same pressing forces are applied, the rolling ratio at the first rolling deformation point X is different from the rolling ratio at the second rolling deformation point Y and the ratio of them can not be constant but it is varied with the types of the plastic films and rolling conditions.

The plastic film entering the second deformation point Y shows the resistance against the rolling deformation which is different from that of the plastic film entering the first rolling deformation point X. As one of the major changes, it resists against the additional longitudinal deformation because the tying molecules connecting crystals are stretched by tension in the longitudinal direction due to the deformation received at the first rolling deformation point X. In addition, the changes in the degree of crystallinity through collapsing and rearrangement of crystals, and transition of the high-order structure to another structure may occur by the deformation at the first deformation point X, which also affect the resistance against the rolling deformation. When the size of crystals or the high-order structure are relatively large, the resistance against such deformation as to reduce the film thickness below a certain level may be increased because the deformation of the these high-order structure is limited by the thickness.

Accordingly, when the same pressing force is applied, depending on the balance of the rolling at the two rolling deformation points, the ratio of the rolling ratio at the first rolling deformation point to the rolling ratio at the second rolling deformation point may vary. If the middle roll 30 is a driving roll rotating at certain peripheral speed, it is not possible to obtain stably a good product unless the roll is controlled by calculating the roll speed. This procedure is quite troublesome and if the roll speed is not proper, the film may be torn off or loosened on the middle roll and it will be dragged into the rolling deformation point.

In the embodiment as shown in FIG. 3, the peripheral speed $V_2$ of the follower middle roll 30 is varied according to the types of plastic films 26 to be rolled or the rolling conditions and it will rotate at a constant and stable speed for a specific plastic film 26 and specific rolling conditions. That is, the ratio of the rolling ratio at the first rolling deformation point to the rolling ratio at the second rolling deformation point is automatically controlled so as to be adapted to the types of plastic film 26 to be rolled and rolling conditions. Therefore, it is not necessary to carry out troublesome calculation in order to determine the optimum peripheral speeds to drive the follower middle roll 30, but it is rather desirable to allow roller to be non-powered and to rotate freely.

Moreover, in FIG. 3, one side surface of the plastic film 26 is denoted as P and the other side surface, as Q. The follower middle roll 30 having higher peripheral speed than the lower peripheral speed driving roll 28 act on the one side surface P of the plastic film 26 at the first rolling deformation point X. The higher peripheral speed driving roll 32 which has higher peripheral speed than the follower roll 30 act on the other side surface Q of the plastic film 26 at the second rolling deformation point Y. Thus, the one side surface P and the other side surface Q of the plastic film 26 alternately receive tensile stresses, thereby preventing the formation of curls in the plastic film, which curls were caused to occur in the conventional rolling employing a single rolling deformation point.

Figure 4:
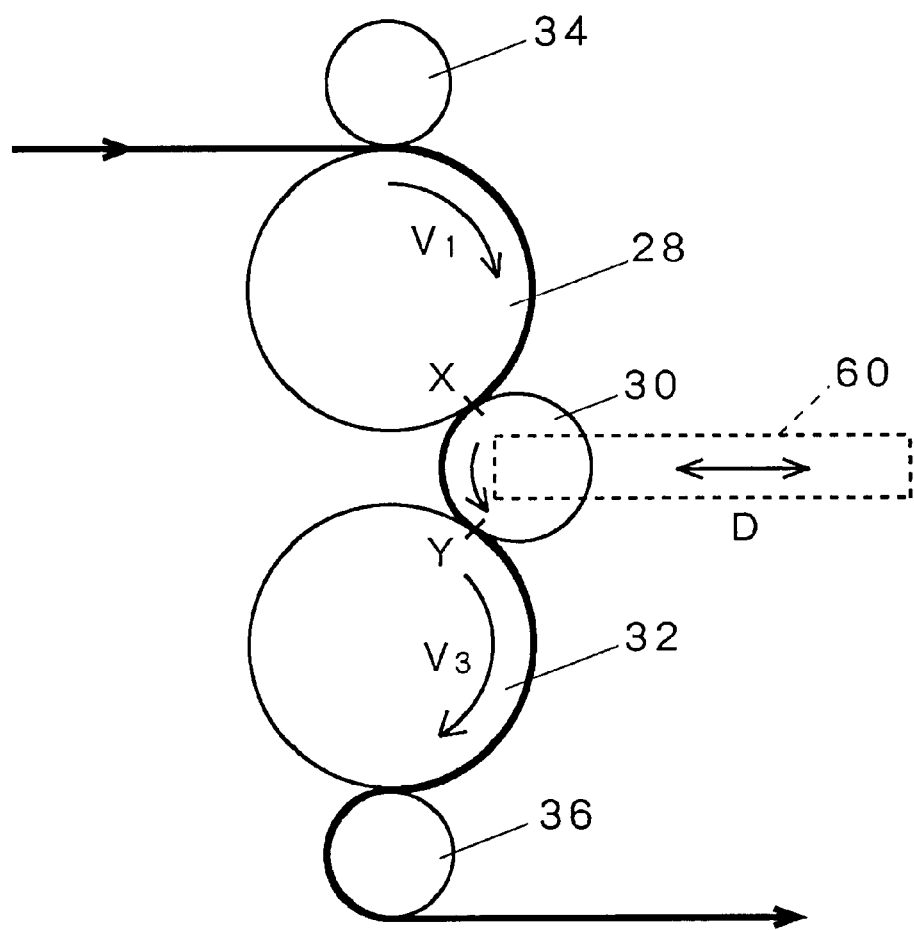
FIG. 4 is a front view of a first modification of the pressure rolls shown in FIG. 3.

FIG. 4 illustrates a front view of a first modification of the rolling device as shown in FIG. 3. Likewise the rolling apparatus shown in FIG. 3, this rolling device includes a lower speed driving roll 28 which is rotated at a peripheral speed $V_1$, a higher speed driving roll 32 which is rotated at a peripheral speed $V_3$, and a follower roll 30 which is driven at a peripheral speed $V_2$ by means of the contact with these driving rolls 28 and 32. The lower speed driving roll 28 and the higher speed driving roll 32 are rotatably supported to fixed positions, respectively, while the follower roll 30 is rotatably supported by a supporting means 60 which is movable, for example, in the direction shown by an arrow D so as to approach to or get apart from these driving rolls 28 and 32. Thus, this supporting means 60 provides the pressing force. The follower roll 30 may be made smaller in size than the driving rolls 28 and 32, so that the structure of the rolling apparatus as a whole can be made simple as compared with the structure of the rolling apparatus employing the mechanism in which the driving rolls 28 and 32 are movably supported.

Figure 5:
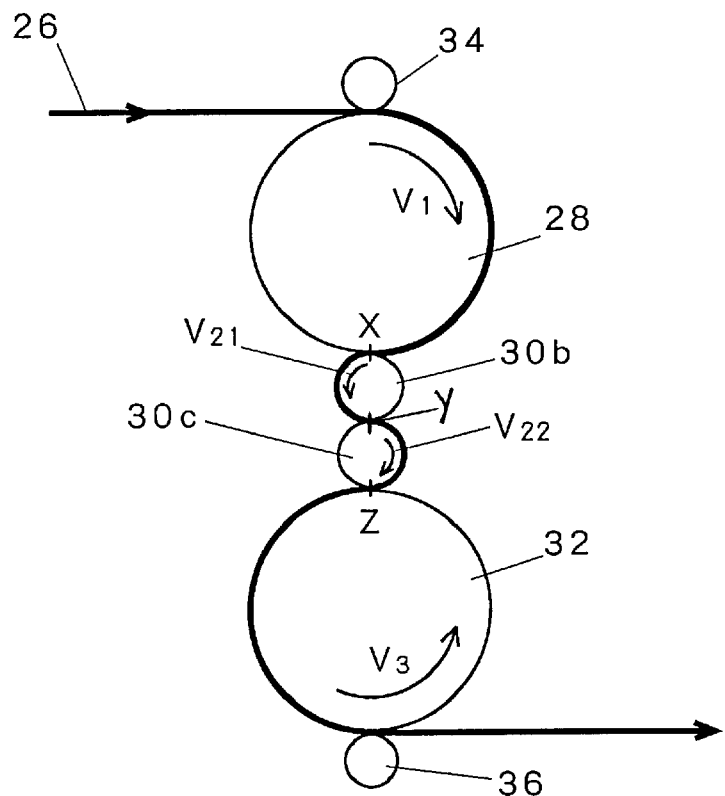
FIG. 5 is a front view of a second modification of the pressure rolls shown in FIG. 3.

FIG. 5 illustrates a front view of a second modification of the roll shown in FIG. 3. This squeezing roll like the rolling apparatus shown in FIG. 3 includes the lower speed driving roll 28 which is driven at the peripheral speed $V_1$, the higher speed driving roll 32 which is driven at the peripheral speed $V_3$. Two follower rolls 30b, 30c are disposed between these driving rolls 28, 32. The two follower rolls 30b, 30c are driven by the driving rolls 28, 32, respectively and also driven by the counterpart follower rolls 30c, 30b, respectively. Thus, the respective peripheral speeds V21, V22 of the follower rolls 30b, 30c are different each other. Therefore, three rolling deformation points X, Y, Z are formed in this rolling apparatus, which enable rolling operation with reduced rolling ratio and rolling pressure at each stage.

Figure 6:
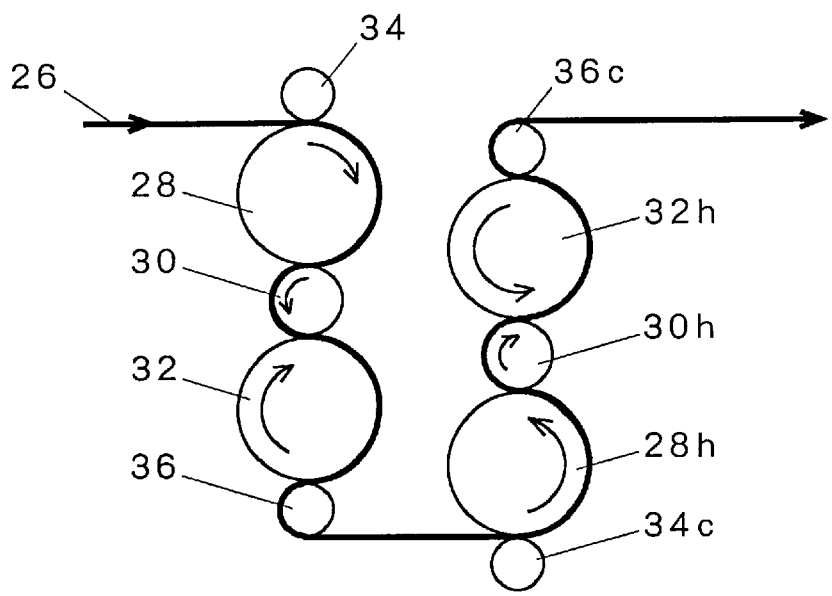
FIG. 6 is a front view of a third modification of the roll shown in FIG. 3.

FIG. 6 is a front view of a third modification of the pressing roll as shown in FIG. 3. This roll includes a lower peripheral speed driving roll 28, a follower roll 30 and a higher peripheral speed driving roll 32 as well as a lower peripheral speed driving roll 28h, a follower roll 30h and a higher peripheral speed driving roll 32h, each of which are arranged in series. In this rolling apparatus, four rolling deformation points are formed, so that the rolling operation can be done with lower rolling ratios and rolling pressures at the respective stages.

Figure 8:
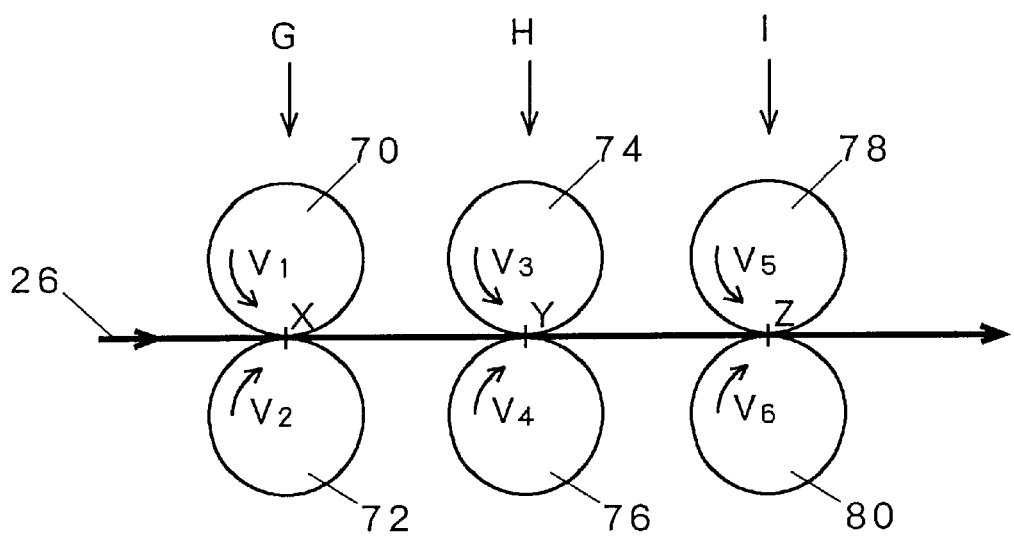
FIG. 8 is a front view of a modification of the pressure roll shown in FIG. 7.

FIG. 7 and FIG. 8 illustrate front views of roll arrangements, each of which consists of paired even number of rolls. In these rolls, all the rolls are driving rolls.

In FIG. 7, two pairs of rolls 70 and 72, and 74 and 76 are disposed along the passage of the plastic film 26. The first pair of the rolls 70 and 72 form a first rolling deformation point X and a press-down means (not shown) pushes down one roll 70 toward the other side roll 72 as indicated by an arrow G. The peripheral speed $V_1$ of the roll 70 on one side (upside) is small than the peripheral speed $V_2$ of the roll 72 on the other side (downside). Likewise, the second pair of the rolls 74 and 76 form the second rolling deformation point and a press-down means (not shown) pushes one roll 74 toward the other side roll 76 as shown by an arrow H. The peripheral speed $V_3$ of the roll 74 on one side (upside) is larger than the peripheral speed $V_4$ of the other side (downside) roll 76.

The plastic film 26 has a one side surface P and the other side surface Q. Also in this case, the downside roll 72 having a higher peripheral speed acts on the other side surface Q of the plastic film 26 at the first rolling deformation point X. The upside roll 74 having higher peripheral speed acts on the one side surface P of the plastic film 26 at the second rolling deformation point Y. Thus, the one side surface P and the other side surface Q of the plastic film 26 alternately receive tensile stresses, thereby enabling to prevent the curling of the plastic film which was caused to occur in the prior art rolling operation adopting a single rolling deformation point.

In FIG. 8, three pairs of rolls 70 and 72; 74 and 76; and 78 and 80 are disposed along the passage of the plastic film 26. The press-down means (not shown) provides pressing down force to the respective pairs of the rolls 70 and 72; 74 and 76; and 78 and 80 as shown by arrows G, H and I. Other features in this example are the same as those described in the example as shown in FIG. 7. That is, in the rolls 70, 72, 74 and 76, the peripheral speed $V_1$ is smaller than $V_2$ at the rolling deformation point X and the peripheral speed $V_3$ is larger than $V_4$ at the rolling deformation point Y. In the rolls 78 and 80, the peripheral speed $V_5$ is smaller than $V_6$ at the rolling deformation point Z.

Industrial Applicability

As described above, according to the present invention, it is possible to manufacture a quality wrinkleless plastic film without the reduction of width with high productivity.

We claim:

1. A rolling apparatus for a plastic film which if provided with at least three rolls disposed along the passage of said plastic film, wherein a plurality of rolling deformation points are formed between adjacent rolls so as to subject said plastic film to stepwise rolling with said rolls, an upstream roll and a downstream roll of said at least three rolls are driving rolls, at least one intermediate roll between said upstream roll and said downstream roll of said at least three rolls comprising at least one follower roll; including driving means for driving said driving rolls, wherein adjacent two of said rolls at one deformation point are rotated in such a manner that the peripheral speed of the roll on one side of the film is larger than the peripheral speed of the roll on the other side of the film, and two other adjacent rolls at the successive deformation point are rotated such that the peripheral speed of the roll on said one side of the film is smaller than the speed of the roll on the other side of the film.

2. A rolling apparatus for a plastic film as claimed in claim 1, wherein said apparatus is equipped with press-down means in order to impart a downward pressing force to push one of said two driving rolls toward another roll.

3. A rolling apparatus for a plastic film as claimed in claim 1, wherein said apparatus is equipped with a pressing means in order to impart a pressing force for rolling by pushing said follower roll or rolls toward said two driving rolls.

4. A rolling apparatus for plastic film which comprises:

an upstream side driving roll, a downstream side driving roll which is rotated at a peripheral speed higher than that of said upstream side driving roll, a follower roll which forms an upstream side rolling deformation point with said upstream side driving roll to effect rolling of a plastic film while forming a downstream side rolling deformation point with said downstream side driving roll to effect further rolling of the plastic film once rolled at said upstream side rolling deformation point; including driving means for driving said driving rolls, wherein adjacent two of said rolls at one deformation point are rotated in such a manner that the peripheral speed of the roll on one side of the film is larger than the peripheral speed of the roll on the other side of the film, and two other adjacent rolls at the successive deformation point are rotated such that the peripheral speed of the roll on said one side of the film is smaller than the speed of the roll on the other side of the film.

5. A rolling apparatus for a plastic film which comprises:

an upstream side driving roll, a downstream side driving roll which is rotated at a peripheral speed higher than that of the upstream side driving roll, an upstream side follower roll which forms an upstream side rolling deformation point with said upstream side driving roll to effect rolling of a plastic film, a downstream side follower roll which forms a middle rolling deformation point with said upstream side follower roll further effect rolling of the plastic film once rolled at said upstream side rolling deformation point while forming a downstream side rolling deformation point with said downstream side driving roll still further to effect rolling of the plastic film rolled at said middle rolling deformation point; including driving means for driving said driving rolls, wherein adjacent two of said rolls at one deformation point are rotated in such a manner that the peripheral speed of the roll on one side of the film is larger than the peripheral speed of the roll on the other side of the film, and two other adjacent rolls at the successive deformation point are rotated such that the peripheral speed of the roll on said one side of the film is smaller than the speed of the roll on the other side of the film.

* * * * *